United States Patent
Michel et al.

(10) Patent No.: US 9,497,510 B2
(45) Date of Patent: *Nov. 15, 2016

(54) METHOD AND SYSTEM FOR ACQUIRING ELECTRONIC PROGRAMMING GUIDE SIGNALS

(71) Applicant: Comcast Cable Communications, LLC, Philadelphia, PA (US)

(72) Inventors: Walt Michel, Glenside, PA (US); Errol J. D'Souza, Sicklerville, NJ (US); Robert Heiman, Warrington, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 244 days.

This patent is subject to a terminal disclaimer.

(21) Appl. No.: 14/085,517

(22) Filed: Nov. 20, 2013

(65) Prior Publication Data

US 2014/0189745 A1 Jul. 3, 2014

Related U.S. Application Data

(63) Continuation of application No. 12/636,510, filed on Dec. 11, 2009, now Pat. No. 8,621,519, which is a continuation of application No. 10/945,085, filed on Sep. 20, 2004, now Pat. No. 7,634,792.

(51) Int. Cl.
*H04N 5/445* (2011.01)
*G06F 3/00* (2006.01)
*G06F 13/00* (2006.01)
*H04N 21/482* (2011.01)
*H04N 21/462* (2011.01)

(52) U.S. Cl.
CPC ............ *H04N 21/482* (2013.01); *H04N 5/445* (2013.01); *H04N 21/4622* (2013.01)

(58) Field of Classification Search
CPC .............. H04N 21/482; H04N 21/4622; H04N 5/445
USPC ......................... 725/39, 49, 50; 348/725, 731
See application file for complete search history.

(56) References Cited

U.S. PATENT DOCUMENTS

| | | | |
|---|---|---|---|
| 6,003,041 A | 12/1999 | Wugofski | |
| 6,583,825 B1* | 6/2003 | Yuen et al. | .............. 348/731 |
| 6,708,336 B1* | 3/2004 | Bruette | .................... 725/57 |
| 2003/0056216 A1* | 3/2003 | Wugofski | ......... H04N 5/44543 |
| | | | 725/46 |
| 2003/0101452 A1 | 5/2003 | Hanaya et al. | |
| 2003/0213001 A1* | 11/2003 | Yuen | .................. G04G 5/002 |
| | | | 725/136 |

(Continued)

OTHER PUBLICATIONS

Motorola, DAC 600 and RADD, The Digital Addressable Control System, 2 pages, 2001.

*Primary Examiner* — Brian T Pendleton
*Assistant Examiner* — Alan Luong
(74) *Attorney, Agent, or Firm* — Banner & Witcoff, Ltd.

(57) ABSTRACT

A system and method for use in a cable network to acquire electronic programming guide (EPG) content signals from one or more EPG vendors. The system includes a set-top box (STB) for receiving cable signals and EPG signals from a headend controller so that the STB can output the signals to a media output device for display. A conversion table is provided to each STB for use by the STB in determining source IDs associated with a given channel for each EPG vendor, the source IDs for use in acquiring the EPG content signals.

20 Claims, 3 Drawing Sheets

(56) References Cited

U.S. PATENT DOCUMENTS

| | | |
|---|---|---|
| 2003/0233451 A1 | 12/2003 | Ludvig et al. |
| 2004/0168189 A1* | 8/2004 | Reynolds .......... H04N 5/44543 725/42 |
| 2006/0271958 A1 | 11/2006 | Ukai et al. |

* cited by examiner

SECOND CHANNEL MAP (44)

| CHANNEL NUMBER | CALL SIGN | SOURCE ID |
|---|---|---|
| 2 | ABC | 10,001 |
| 4 | CBS | 10,002 |
| 6 | NBC | 10,003 |
| 8 | FOX | 10,004 |
| 10 | ESPN | 10,005 |
| ... | ... | ... |
| 601 | EPGV2 | 99999 |
| ... | ... | ... |

*Fig-3*

CONVERSION TABLE (80)

| CHANNEL MAP | CHANNEL NUMBER | SOURCE ID |
|---|---|---|
| 1 | 2 | 9001 |
| 1 | 4 | 9002 |
| 1 | 6 | 9003 |
| 1 | 8 | 9004 |
| 1 | 10 | 9005 |
| ... | ... | ... |
| 1 | 601 | 99999 |
| ... | ... | ... |
| 2 | 3 | 9001 |
| 2 | 4 | 9002 |
| 2 | 7 | 9003 |
| 2 | 8 | 9004 |
| 2 | 10 | 9005 |
| ... | ... | ... |
| 2 | 602 | 99999 |
| ... | ... | ... |

*Fig-5*

FIRST EPG VENDOR CONTENT MAP

| SOURCE ID | DATE | TIME | PGM TITLE | PGM DESCRIPTION |
|---|---|---|---|---|
| 10001 | 7/2/2004 | 18:30 | ACTION NEWS | TODAY'S NEWS |
| 10001 | 7/2/2004 | 19:00 | JEAPORDY | GAME SHOW |
| ... | ... | ... | ... | ... |
| 10002 | 7/2/2004 | 18:30 | WCBS NEWS | ... |
| 10002 | 7/2/2004 | 19:00 | ... | ... |
| ... | ... | ... | ... | ... |

Fig-4

SECOND EPG VENDOR CONTENT MAP

| SOURCE ID | DATE | TIME | PGM TITLE | PGM DESCRIPTION |
|---|---|---|---|---|
| 9001 | 7/2/2004 | 18:30 | ACTION NEWS | TODAY'S NEWS |
| 9001 | 7/2/2004 | 19:00 | JEAPORDY | GAME SHOW |
| ... | ... | ... | ... | ... |
| 9002 | 7/2/2004 | 18:30 | WCBS NEWS | ... |
| 9002 | 7/2/2004 | 19:00 | ... | ... |
| ... | ... | ... | ... | ... |

Fig-6

METHOD AND SYSTEM FOR ACQUIRING ELECTRONIC PROGRAMMING GUIDE SIGNALS

CROSS REFERENCE TO RELATED APPLICATIONS

This application is a continuation of U.S. patent application Ser. No. 12/636,510, filed on Dec. 11, 2009, titled "Method and System for Acquiring Electronic Programming Guide Signals," which is a continuation of U.S. patent application Ser. No. 10/945,085 (now U.S. Pat. No. 7,634,792), filed on Sep. 20, 2004, titled "Method and System for Acquiring and Converting Electronic Programming Guide Signals From Multiple Vendors," the contents of which are hereby incorporated by reference in their entirety.

BACKGROUND OF THE INVENTION

Field of the Invention

The present invention relates to mapping a source identification used in associating electronic programming guide (EPG) content information with television signals.

Background Art

A cable television provider streams television signals from a headend controller to a number of settop boxes (STB) over cable lines or other mediums. Selective portions of the signals are acquired by the STB for viewing desired channels. As part of these signals, the STB receives a channel map for determining if a user-selectable channel is part of the channel map, and is hence, tunable. The channel map is typically downloaded to the STB from the headend controller. Part of this download includes a table or other arrangement for relating channels or call signs to a particular channel identification or source identification (ID).

In addition to displaying the selected channel, the STB may include an electronic programming guide (EPG) for displaying EPG content information associated with the available channels. The EPG content information provides textual and visual descriptions of programs, movies, news, or other items showing on a particular channel for a particular period in time. The EPG can provide a number of features for displaying the EPG content information, such as in a selection guide that displays content information for a number of channels according to a number of time slots and/or in an overlay that appears across the bottom of the screen when the tuned to channel is changed.

Most headend controllers use a vendor-specific approach for providing the mapping of channel numbers to source IDs. In this approach, the source ID for each channel is predefined by the EPG vendor as a numeric reference value for that content source, such as 10,001 for ESPN, 10,002 for HBO, etc. The source ID is used by the STB to correlate the channel number with EPG content on that channel. The EPG content information is provided to the STB by the EPG content vendor. Like the cable television provider, the EPG vendor streams EPG content signals to the STB over the cable lines or other communication medium. The EPG selects the desired EPG content information from the signals based on the source ID. In general, the STB receives a channel input from a user, consults the channel map to determine the channel's existence in the map and its associated source ID, tunes to the desired channel and puts up source-specific EPG content based on the source ID information.

A problem arises with this approach, however, if the cable television provider desires to change the EPG vendor to a new EPG vendor that associates its EPG content information with source IDs that are different from the source IDs of the original EPG vendor. The ability to change EPG content providers is desirable because some EPG vendors provide better services than others. To accommodate a new EPG vendor, the headend controller must either change the channel map(s) to reflect the new source IDs, or support duplicate channel maps, one with each set of EPG vendor-specific source IDs. Changing the channel map each time the EPG vendor is changed is undesirable because it can lead to long-term operational maintenance issues and/or cause interruptions in service. Supporting duplicate channels maps is undesirable because it consumes bandwidth and leads to long-term operation maintenance issues. Also, with each new EPG vendor, a new variant of the channel map would need to be created, making the solution even more untenable.

SUMMARY OF THE INVENTION

It is, therefore, an object of the present invention to provide a method and system for acquiring electronic programming guide (EPG) signals that overcomes the above-identified problems of the prior art.

The present invention contemplates a number of features for acquiring EPG signals, including, but not limited to, a system for use in a cable network to acquire EPG content signals from one or more EPG vendors. The system includes a set-top box (STB) for receiving cable signals from a headend controller and EPG content signals from an EPG vendor so that the STB can output the signals to a media output device for display.

A channel map is preferably provided to the STB for use by the STB in acquiring channels provided by the headend controller. The channel map preferably includes a number of source identifications (IDs) associated with a call sign for each channel offered by the headend controller. The source IDs can be used by the STB to acquire EPG content signals provided by an EPG vendor so that the EPG content information can be communicated to a user through the media output device.

A conversion table is preferably provided to the STB for use by the STB in selecting source IDs that are different from the source IDs included in the channel map, such as to receive EPG signals from a different EPG vendor that associates its EPG content signals with source IDs that are different from the source IDs in the channel map.

In accordance with one aspect of the present invention, the channel map includes a use portion that designates the channels with their associated call sign and source ID and a non-use portion that designates a non-use channel number. Preferably, the non-use channel number is associated with the source IDs in the conversion table so that the STB can be controlled to select source IDs from the conversion table based on the non-use channel if the non-use channel is recognized. In this manner, EPG content signals can be received from the EPG vendor associated with the source IDs of the conversion table instead of the EPG vendor associated with the source IDs of the channel map.

The above features and advantages, along with other features and advantages of the present invention, are readily apparent from the following detailed description of the invention when taken in connection with the accompanying drawings.

BRIEF DESCRIPTION OF THE DRAWINGS

FIG. 3 illustrates a second channel map in accordance with one aspect of the present invention;

FIG. 4 illustrates an EPG content map for a first EPG vendor in accordance with one aspect of the present invention;

FIG. 5 illustrates a conversion table in accordance with one aspect of the present invention; and FIG. 6 illustrates an EPG content map for a second EPG vendor in accordance with one aspect of the present invention.

DETAILED DESCRIPTION OF THE PREFERRED EMBODIMENT(S)

Figures 1, 2:
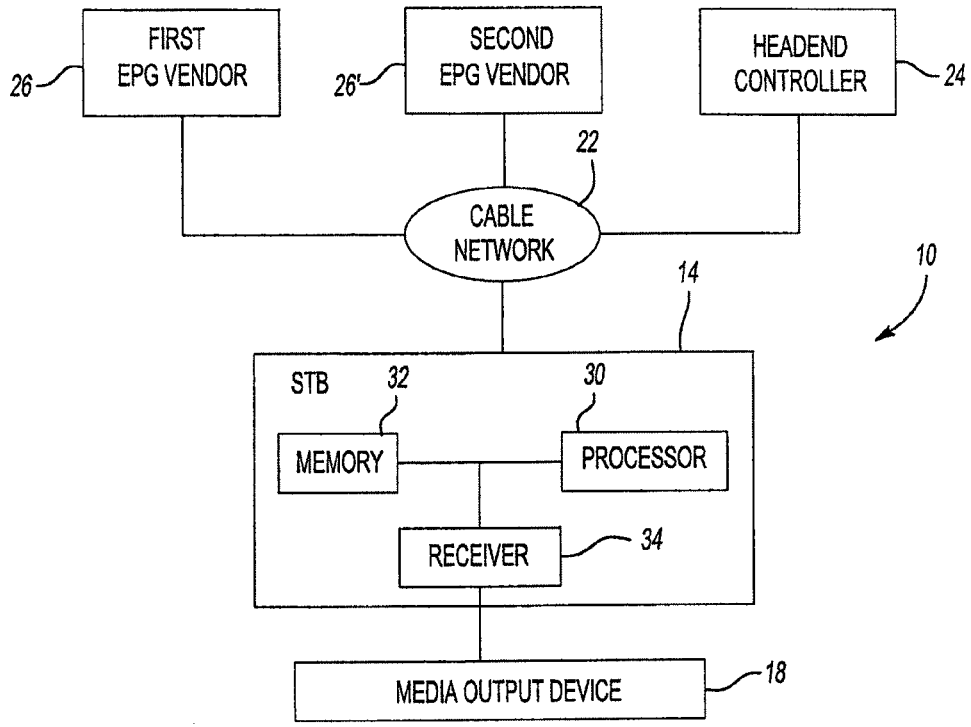
FIG. 1 illustrates a system for providing electronic programming guide (EPG) signals in accordance with one aspect of the present invention.
FIG. 2 illustrates a first channel map in accordance with one aspect of the present invention.

FIG. 1 illustrates a system 10 for providing cable television signals and electronic programming guide (EPG) signals to a set-top box (STB) 14 connected to a media output device 18 in accordance with one aspect of the present invention. The channel signals and the EPG content signals are streamed over a cable network 22 from a headend controller 24 and an EPG vendor 26, 26', respectively. The STB 14 is operable to select desired portions of the signals for output to the media output device 18, which can be a television, computer, or other display device.

The STB 14 includes a processor 30 and a memory 32 for controlling operation of the STB according to instructions provided by an STB application. The STB 14 application can provide a number of features, including supplying an EPG for acquiring desired channels and providing programming information. The STB 14 includes a receiver 34 or other means for receiving inputs from a user, such as through a remote control or buttons provided on the STB 14. The present invention contemplates other features and configurations for the STB 14, including integrating the STB 14 with the television or other device, such as a computer.

The headend controller 24 is an infrastructure for providing television signals to subscribers of a cable television provider. It can include any number of features for receiving external programming provider signals and information relating to television, movies, or other media. The headend controller 24 can include antennae or satellite dishes for reception of signals from cable providers like ESPN, CNN, or HBO and from network television providers like NBC, ABC, CBS, and FOX. In addition, signals can be received at the headend controller 24 over other interfaces, such as via fiber optics, telephone wires, the Internet, microwave towers and local community access channels.

The headend controller 24 processes the signals it receives for output over the cable network 22 to its subscribers. Once received, the signals can be amplified and mixed into the other signals received and output by the headend controller 24, such as through a cable system channel numbering scheme using a frequency multiplexer that associates particular signals to particular source IDs. Once processed, the television signals are sent over the cable network 22, such as through coaxial cables, and tuned to by the STB 14.

The EPG vendor 26 is a provider of EPG content information for the televisions signals. The EPG content information can include any type of graphical and non-graphical data used to provide additional information for the television signals, such as titles, summaries, ratings, run-time, reviews, and other information related to the programs and movies offered by the headend controller 24. The EPG content information is processed by the STB application for output in an EPG visual representation. As is known in the art, the EPG view provides a navigatable medium for viewing the textual and visual descriptions associated with the EPG content information, such as in a selection guide that displays content information for a number of channels according to a number of time slots and/or in an overlay that appears across the bottom of the screen when the tuned to channel is changed.

The EPG vendor 26, 26' includes a server that is configured in a manner similar to the head end controller 24 in that it is designed to receive data from EPG providers and to process that data for streaming over the cable network 22. Once received and processed, the data is output by the EPG vendor 26, 26', such as through a numbering scheme that associates particular content signals to a source ID, and sent over the cable network 22 for selection by the STB 14 according to the associated source IDs.

Of course, the present invention is not limited to the type of media signals transferred to the STB 14 or the means by which the signals are transferred. The present invention contemplates a number of features and configurations, including signal transmission over public switching telephone networks, digital subscriber lines, fibre optic lines, wireless transmitters, satellite transmitters, and the like. Moreover, the present invention is not limited to a particular STB 14 configuration. Rather, any number of STBs 14 are operable with the present invention, including STBs 14 that provide functionality beyond merely acquiring channels, such as STBs 14 having digital video recorders (DVRs).

FIGS. 2-3 illustrate a first channel map 40 and second channel map 44 for a first EPG vendor 26 in accordance with one aspect of the present invention. The channel maps 40 and 44 are downloaded from the headend controller 24 to an STB 14. The first and second channel maps 40 and 44 are used independently in different geographical areas supported by the same headend controller 24. Each map 40 and 44 is separately and selectively downloaded to each STB 14 by the headend controller 24, such that the first channel map 40 is downloaded to a first STB 14 in a given geographical area and the second channel map 44 is downloaded to a second STB 14 in a different geographical area.

The channel maps 40 and 44 are preferably stored in the memory 32 of each STB 14. Each channel map 40 and 44 includes a channel number column 48, a call sign column 50, and a source ID column 52. The channel number column 48 includes a use portion 54 that indicates channels that can be tuned to by the STB 14 for tuning in a desired channel. The call sign column 50 indicates the provider of the associated channel, such as ABC, CBS, NBC, FOX, and ESPN. The source ID column 52 indicates the source ID associated with a particular call sign for the first EPG 26, i.e. the ABC is associated with source ID 10,001, FOX is associated with source ID 10,004, etc.

The first and second channel maps 40 and 44 are required because each geographical area includes different channel numbers for a particular call sign. For example, the first channel map associates ABC with channel number 3 and the second channel map associates ABC with channel number 2. The different channels for the same call sign is a common occurrence where the headend controller 24 supports different geographical areas because channel designations vary based on factors including cable business rules determining channel ordering, as well as channel and network availability.

The source IDs correspond with a predefined numerical value assigned by the first EPG vendor 26 for associating EPG content information with each channel based on the call sign associated with the channel. A single source ID can be used for both the first and second channel maps 40 and 44 because the source IDs are associated with the call signs, as opposed to the channel numbers. The headend controller 24 configures the channel maps to include the source IDs specified by the first EPG vendor 26.

FIG. 4 illustrates an EPG content map 60 that depicts EPG content information provided by the first EPG vendor 26 in accordance with one aspect of the present invention. The EPG content map includes a source ID column 64, a date column 66, a time column 68, a program title column 70, and a program description column 72. Each column 64-72 provides EPG content information that can be used by the STB 14 for display to the user. The EPG content information is retrievable based on the source IDs determined from one of the channel maps 40 and 44. The EPG content map 60 shown in FIG. 4 is abbreviated to only show a sampling of the content information and the map 60 includes other information and columns, including at least EPG content information for each call sign supported by the headend controller 24. The EPG content information shown in FIG. 4 represents only a portion of the EPG content information, and more or less information is contemplated by the present invention.

FIG. 5 illustrates a conversion table 80 in accordance with one aspect of the present invention. The conversion table 80 is a table stored in the memory 32 of the STB 14 and is separately and selectively downloaded by a second EPG vendor 26 to each STB 14 serviced by the headend controller 24 in the event that the STB 14 is to change EPG vendors from the first EPG vendor 26 to a second EPG vendor 26'. Alternatively, the conversion table 80 can be downloaded to the STB 14 from the headend controller 24 after the headend controller 24 receives the conversion table 80 from the second EPG vendor 26' and/or if the headend controller 24 constructs the conversion table 80 itself. The conversion table 80 is provided so that the source IDs supported by the second EPG vendor 26' can be determined by the STB 14 without requiring the headend controller 24 to substantially change the first and second channel maps 40 and 44.

The conversion table 80 includes a channel map column 84, a channel number column 86, and a source ID column 88. The channel map column 84 refers to one or more of the channel maps supported by the headend controller 24, such as the first and second channel maps 40 and 44 described above. The channel number column 86 indicates the channel numbers supported by each channel map 40 and 44. The source ID column 88 indicates the source IDs for the channels associated with the second EPG vendor 26'. As shown, the source ID column 88 includes source IDs having a nine-thousand series designation, as opposed to the source IDs shown in FIGS. 2-3 that have a ten-thousand series designation. For example, and with respect to the first channel map 40, the first EPG vendor 26 associates ABC and FOX with source IDs 10,001 and 10,004, whereas the second EPG vendor 26' associates ABC and FOX with source IDs 9,001 and 9,004.

When the EPG vendor is changed from the first EPG vendor 26 to the second EPG vendor 26', the STB 14 is to retrieve EPG content information from the second EPG vendor 26' instead of the first EPG vendor 26. This can create a problem because the second EPG vendor 26' associates different source IDs with the available channels. The conversion table 80 overcomes this problem by providing a means for mapping a request for EPG content information to the source IDs of the second EPG vendor 26'.

One aspect to supporting the change in EPG vendors is to instruct the STB 14 that it is to use the conversion table 80, as opposed to the channel maps 40 and 44, to determine the source IDs. The STB 14 can be instructed, for example, by the headend controller 24 delivering a change EPG vendor signal to the STB 14.

Returning to FIGS. 2 and 3, the change EPG vendor signal prompts the STB 14 to recognize a non-use channel portion 92 of the channel map 40 and 44 used by the STB 14. The non-use channel portion 92 corresponds with a number of hidden channels set aside for headend controller 24 signaling operations, such as channels 601-699. Each non-use channel may preferably include an EPG vendor identifier in the call sign column 50 to indicate an EPG vendor 26, 26' associated with the non-use channel. Preferably, a generic non-use source ID, such as 99,999, is associated with each EPG vendor identifier to provide a unique identifier for the vendor. Preferably, the non-use portion 92 of the channel map 40 and 44 includes one non-use channel and thereby one EPG vendor identifier. The use of multiple non-use channels, however, is contemplated and additional control logic to support the use thereof is similarly contemplated so that more than one EPG vendor identifier can be included in the channel map 40 and 44. In addition to the headend controller 24 delivering the change EPG vendor signals to the STB 14, the second EPG vendor 26' can be configured to deliver a similar signal to the STB 14. This allows the EPG vendor 26, 26' to control operation of the STB 14, which can be helpful to ameliorate the processing demands on the headend controller 24. Still further, the STB 14 can be configured with an EPG conversion map application that operates on the STB 14 to receive the change EPG vendor signals from the headend controller 24 and/or the EPG vendor 26, 26' and to perform processing in response thereto.

The recognition of the non-use channel indicates to the STB 14 that the first and second channel maps 40 and 44 are inactive for determining the source IDs and that the conversion table 80 is active for determining the source IDs. The STB application, however, maintains operational use of the channel maps 40 and 44 for determining the EPG vendor 26, 26' that is to provide the EPG content information. In more detail, the STB 14 receives the change EPG vendor signals from the headend controller 24 and the conversion table 80 from the second EPG vendor 26' and/or through the headend controller 24, it then receives a request for EPG content information and consults the appropriate channel map 40 and 44 to determine the EPG vendor identifier associated with the non-use channel of the relevant channel map 40 and 44, it then consults the conversion table 80 to determine the source ID for the proper EPG vendor, and it then finally retrieves the desired EPG content information from the second EPG vendor 26' based on the source ID determined from the conversion table 80.

The use of the conversion table 80 is advantageous because it allows the headend controller 24 to change and mix EPG vendors 26, 26' in the same plant without creating a new channel map or eliminating the source IDs associated with the original vendor. Rather, the headend controller 24 can request the second and subsequent EPG vendors 26, 26' to create and support the conversion table 80 and deliver it to the headend controller 24 so that the headend controller 24 can download it to the appropriate STBs 14, whereby the headend controller 24 is only required to add or change the non-use channel populated in the non-use portion 92 of the relevant channel map 40 and 44, and provide this non-use channel information to the respective EPG vendor 26, 26' to implement into their application.

FIG. 6 illustrates an EPG content map 96 that depicts EPG content information provided by the second EPG vendor 26' in accordance with one aspect of the present invention. The EPG content map 96 includes the source ID column 64, the date column 66, the time column 68, the program title column 70, and the program description column 72. Each column provides 64-72 EPG content information that can be used by the STB for display to the user. The EPG content information is retrievable based on the source IDs determined from the conversion table 80.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method comprising:
    sending, from a first computing device and to a second computing device, a first channel map associated with a first channel map provider;
    sending, from the first computing device and to the second computing device, a conversion table comprising a portion of the first channel map mapped to a plurality of source identifiers associated with a second channel map provider different from the first channel map provider; and
    sending, from the first computing device and to the second computing device, an instruction to switch from using the first channel map provider to using the second channel map provider via the conversion table.

2. The method of claim 1, further comprising:
    generating the conversion table, the conversion table comprising a first set of channel numbers for the first channel map and a second set of channel numbers for a second channel map associated with the first channel map provider.

3. The method of claim 2, wherein generating the conversion table comprises:
    mapping the first set of channel numbers to a first set of the plurality of source identifiers; and
    mapping the second set of channel numbers to a second set of the plurality of source identifiers where the first set of channel numbers has at least one channel number different from a respective channel number of the second set of channel numbers.

4. The method of claim 2, wherein generating the conversion table comprises:
    indicating that each channel number of the first set of channel numbers corresponds to the first channel map; and
    indicating that each channel number of the second set of channel numbers corresponds to the second channel map.

5. The method of claim 1, wherein the instruction prompts the second computing device to recognize a non-use channel portion of the first channel map, wherein the non-use channel portion identifies the second channel map provider.

6. The method of claim 1, wherein the instruction causes the first channel map to become inactive for determining source identifiers.

7. The method of claim 1, wherein the conversion table comprises a channel number of the first channel map provider mapped to a particular source identifier of the second channel map provider, and wherein the channel number and the particular source identifier are associated with a same call sign.

8. A method comprising:
    sending, from a first computing device and to a second computing device, a conversion table mapping a first set of channel numbers associated with a first channel map of a first channel map provider to a set of source identifiers associated with a second channel map provider different from the first channel map provider; and
    sending, from the first computing device and to the second computing device, a change channel map provider signal instructing the second computing device to use the conversion table.

9. The method of claim 8, further comprising generating the conversion table by:
    mapping a second set of channel numbers associated with a second channel map of the first channel map provider to another set of source identifiers associated with the second channel map provider.

10. The method of claim 9, wherein the conversion table comprises an identifier of the first channel map mapped to the first set of channel numbers and an identifier of the second channel map mapped to the second set of channel numbers.

11. The method of claim 9, wherein the change channel map provider signal identifies the second channel map provider.

12. The method of claim 8, wherein the change channel map provider signal causes the first channel map to become inactive for determining source identifiers.

13. The method of claim 8, further comprising:
    sending, from the first computing device and to the second computing device, the first channel map associated with the first channel map provider.

14. The method of claim 8, wherein the conversion table comprises a channel number of the first channel map provider mapped to a particular source identifier of the second channel map provider, and wherein the channel number and the particular source identifier are associated with a same call sign.

15. A method comprising:
    receiving, from a first device and by a second device, a first channel map associated with a first channel map provider;
    receiving, from the first device and by the second device, a conversion table that maps a portion of the first channel map associated with the first channel map provider to source identifiers associated with a second channel map provider different from the first channel map provider; and
    in response to receiving a change channel map provider signal, using the conversion table to access the source identifiers associated with the second channel map provider.

16. The method of claim 15, further comprising:
    prior to receiving the change channel map provider signal, using the first channel map to access source identifiers associated with the first channel map provider.

17. The method of claim 15, further comprising:
    determining to use the source identifiers associated with the second channel map provider based on a non-use channel of the first channel map.

18. The method of claim 15, further comprising:
    retrieving media content using the conversion table.

19. The method of claim 15, wherein the conversion table comprises a channel number of the first channel map provider mapped to a particular source identifier of the second channel map provider, and wherein the channel number and the particular source identifier are associated with a same call sign.

20. The method of claim 15, wherein the conversion table comprises a first set of channel numbers of the first channel map and a second set of channel numbers of a second channel map associated with the first channel map provider.

\* \* \* \* \*